June 15, 1965     A. J. H. J. VAN ZON     3,189,787
IGNITION CIRCUIT FOR GAS DISCHARGE TUBES
Filed Nov. 10, 1960

INVENTOR
ADRIANUS J.H.J. VAN ZON
BY
AGENT

United States Patent Office 3,189,787
Patented June 15, 1965

3,189,787
IGNITION CIRCUIT FOR GAS DISCHARGE TUBES
Adrianus Joannes Henricus Josephus van Zon, Eindhoven, Netherlands, assignor to North American Philips Company, Inc., New York, N.Y., a corporation of Delaware
Filed Nov. 10, 1960, Ser. No. 68,497
Claims priority, application Netherlands, Dec. 30, 1959, 246,930
11 Claims. (Cl. 315—96)

This invention relates to circuits including a source of alternating current having a frequency which is determined by an output circuit comprising the parallel combination of an inductor and a capacitor, more particularly, to a circuit including a transistor converter having connected thereto a plurality of loads, and in particular to loads comprising stabilized gaseous discharge tubes which can be switched into or out of circuit individually and have two load conditions, only one of which does not influence the said frequency, the loads in the frequency-influencing condition comprising at least the series-combination of an inductor and a capacitor.

Such a circuit does not cause particular difficulty if only one load is present, since the alternating current source and the load may be matched to each other so that the desired load conditions occur.

If, however, more than one load is present and each load must be capable of being switched into or out of circuit individually, the difficulty arises that for the second and further loads it is no longer immaterial which of the two conditions are occupied by the loads which have already been made operative.

An object of the invention is to provide a circuit which solves the above problems by providing a capacitor in the output circuit which is subdivided into a plurality of partial capacitors connected in series, or by an inductor in the output circuit which is subdivided into partial inductors which are decoupled from one another connected in series, the loads being connected to the partial capacitors if they are of a capacitive character in the frequency-influencing state, or being connected to the partial inductors if they are of an inductive character in this state.

The loads are preferably identical and uniformly divided over the partial reactances.

In order that the invention may be readily carried into effect, it will now be described in detail, by way of example, with reference to the accompanying diagrammatic drawing, in which.

Figure 1:
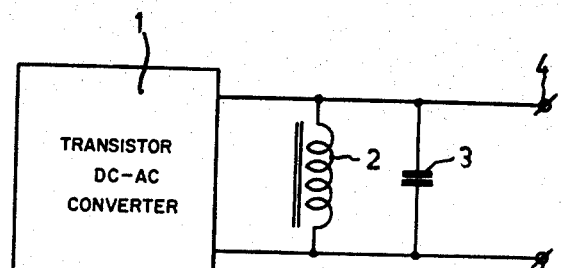
FIGURE 1 shows a transistor converter of known type.

Referring now to FIG. 1, reference numeral 1 indicates a transistor converter of a type known per se, the output circuit of which comprises the parallel combination of an inductor 2 and a capacitor 3, the ends of which are connected to output terminals 4 and 5 which have a voltage difference of, for example, 70 volts in the unloaded condition. The frequency of the current source in the unloaded condition is determined by the reactances 2 and 3.

Figure 2:
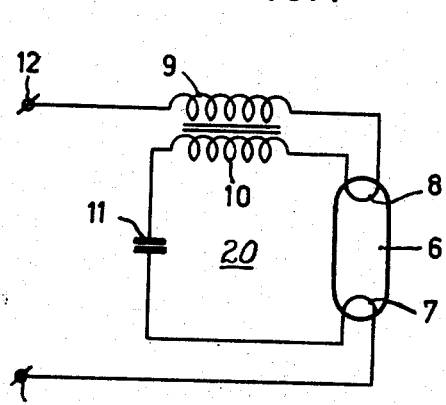
FIGURE 2 shows a stabilized gaseous discharge tube.

FIGURE 2 shows a load 20 comprising a stabilized gaseous discharge tube 6. The tube 6, for example, a low pressure mercury-vapour discharge tube, contains two thermionic electrodes 7 and 8 which are to be heated before ignition takes place. One end of the electrode 7 is connected to an input terminal 13 of the load and one end of the electrode 8 is connected through a winding 9 of a double choke to an input terminal 12 of the load. The other ends of the electrodes are connected together through a second winding 10 of the double choke and a capacitor 11.

Before the ignition of the tube 6, the load essentially comprises the series-combination of the resulting inductance of the windings 9 and 10, the capacitor 11 and the resistance of the electrodes 7 and 8. In this condition the load may have a net capacitive character.

When the tube 6 is in operation, a load ensues which, when fed by a voltage of the frequency such as supplied by the converter in unloaded condition, absorbs a current which is substantially in phase with the said voltage, i.e. that the load in this condition does not substantially influence the frequency of the converter.

When three such stabilized tubes are connected to the converter, which in this case, must, of course, be capable of delivering the threefold output, the frequency and current, of the load in the non-ignited state of the tubes decrease, for example, as follows:

| Number of tubes | Frequency | Current, milliamp. |
|---|---|---|
| 0 | 8,100 |  |
| 1 | 6,700 | 430 |
| 2 | 6,100 | 320 |
| 3 | 5,500 | 250 |

From this it appears that there is a great difference between the preheating currents of the electrodes, according as one, two or three tubes are connected.

This is usually undesirable, since high values of the current may be harmful to the electrodes and low values make the ignition uncertain.

Figure 3:
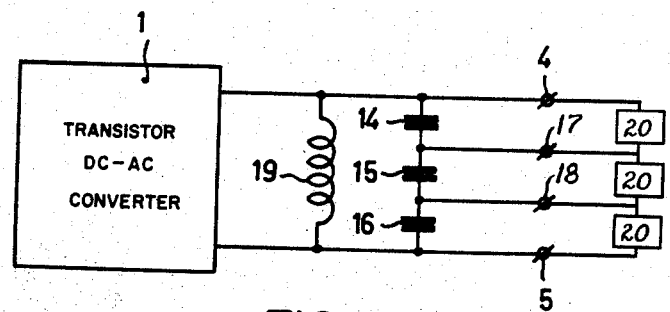
FIGURE 3 shows the transistor converter associated with a circuit according to the invention.

According to the invention, the capacitor 3 in the output circuit is replaced by the series-combination of three partial capacitors 14, 15 and 16 having output terminals 4–17, 17–18 and 18–5 (see FIG. 3).

An inductor 19 and the capacitors 14, 15, 16 of the output circuit may now also be tuned to a frequency of about 8100 c./sec. in the unloaded state, while the voltage between the terminals 4 and 5 is three times as high, so that it is now, for example 210 volts.

When three loads 20 of the type shown in FIG. 2 are connected to the three partial capacitors, in the non-ignited condition of the tubes the following frequencies and currents occur:

| Number of tubes | Frequency | Current, milliamp. |
|---|---|---|
| 0 | 8,100 |  |
| 1 | 7,400 | 250 |
| 2 | 6,600 | 250 |
| 3 | 5,500 | 250 |

Due to the current being substantially constant in this condition, it is possible to design the electrodes 7 and 8 for this current.

Although this embodiment specifies as many partial capacitors as loads, the invention is not limited thereto and also comprises more than one load for each partial reactance.

What is claimed is:

1. An electrical circuit comprising input means for connection to an alternating current source adapted to supply a plurality of load devices, said load devices comprising elements exhibiting a first load condition and a second load condition different from said first load condition, a frequency determining circuit connected across said input means and comprising a first inductive branch circuit and a capacitive branch circuit connected in parallel with said first branch circuit, one of said branch circuits comprising a plurality of series connected reactance elements, and means for selectively connecting said load devices in parallel with individual ones of said reactance elements.

2. An electrical circuit arrangement according to claim 1, wherein said first load condition of said load devices imparts to the circuit a reactance of a given sign, and said second load condition imparts a substantially reactance free appearance to the circuit.

3. An electrical circuit according to claim 2, wherein said load devices are connected in parallel with individual ones of said reactance elements of like reactance sign.

4. An electrical circuit according to claim 1, wherein said series connected reactance elements are capacitors connected in said capacitive branch circuit.

5. An electrical circuit according to claim 1, wherein said series connected reactance elements are inductors connected in said inductive branch circuit.

6. An electrical circuit according to claim 1, wherein said load devices are substantially identical and are evenly divided over the series connected reactance elements.

7. An electrical circuit arrangement comprising input means for connection to an alternating current source adapted to supply a plurality of load devices, said load devices comprising elements exhibiting a first load condition which affects the frequency of said current source and a second load condition which has substantially no affect on said source frequency, a frequency determining circuit connected across said input means and comprising a first inductive branch circuit and a capacitive branch circuit connected in parallel with said first branch circuit, one of said branch circuits comprising a plurality of series connected reactance elements, and means for selectively connecting individual ones of said load devices in parallel with individual ones of said reactance elements.

8. An electrical circuit according to claim 6, wherein each of said load devices comprises a gaseous discharge tube having a pair of filament electrodes, an inductor and a capacitor connected in series, and means for connecting the series combination of said inductor and capacitor to said tube electrodes.

9. A circuit for supplying current to a plurality of load devices including gaseous discharge tubes comprising, a source of alternating current including an output circuit comprising the parallel combination of an inductance means and a capacitance means, said output circuit determining the frequency of the current source, and wherein said capacitance means further comprises a plurality of series connected capacitors, means for selectively individually connecting the load devices in parallel with individual ones of said output circuit capacitors, said load devices when connected having two load conditions, one of which affects the frequency of said current source and the other of which has substantially no affect on said source frequency.

10. A circuit for supplying current to a plurality of load devices including gaseous discharge tubes comprising, a source of alternating current including an output circuit comprising the parallel combination of an inductance means and a capacitance means, said output circuit determining the frequency of the current source, and wherein said inductance means further comprises a plurality of series connected inductors, means for selectively individually connecting the load devices in parallel with individual ones of said output circuit inductors, said load device when connected having two load conditions, one of which affects the frequency of said current source and the other of which has substantially no affect on said source frequency.

11. A circuit for supplying current to a plurality of load devices including gaseous discharge tubes comprising, a source of alternating current including an output circuit comprising the parallel combination of an inductance means and a capacitance means, said output circuit determining the frequency of the current source, and wherein said capacitance means comprises a plurality of series connected capacitors, means for selectively connecting individual ones of said load devices in parallel with individual ones of said output circuit capacitors, said load devices when connected having two load conditions one of which exerts a substantial influence on the frequency of said current source and the other of which exerts little or no influence on said source frequency, said load device in said one frequency influencing load condition effectively comprising the series combination of an inductor and a capacitor which exhibit a net capacitive reactance at the frequency of said current source.

References Cited by the Examiner
UNITED STATES PATENTS

| | | | |
|---|---|---|---|
| 2,020,731 | 11/35 | Lederer | 315—100 |
| 2,121,829 | 6/38 | Seaman et al. | 331—75 |
| 2,284,407 | 5/42 | Edwards | 315—100 |
| 2,438,556 | 3/48 | Henenkamp | 315—99 |
| 2,861,219 | 11/58 | Knobel | 315—99 |
| 2,949,565 | 8/60 | Rohloff | 315—101 X |

GEORGE N. WESTBY, *Primary Examiner.*

RALPH G. NILSEN, DAVID G. GALVIN, *Examiners.*